(12) United States Patent
Schmidt et al.

(10) Patent No.: US 6,594,424 B2
(45) Date of Patent: Jul. 15, 2003

(54) LIGHT MIXING ROD COMPRISING AN INLET AREA AND AN OUTLET AREA AND USE OF SUCH A LIGHT MIXING ROD IN AN OPTICAL DEVICE COMPRISING A SURFACE TO BE ILLUMINATED

(75) Inventors: Dietrich Schmidt, Jena (DE); Christfried Symanowski, Jena (DE)

(73) Assignee: Carl Zeiss Jena GmbH (DE)

( * ) Notice: Subject to any disclaimer, the term of this patent is extended or adjusted under 35 U.S.C. 154(b) by 0 days.

(21) Appl. No.: 10/040,569

(22) Filed: Jan. 7, 2002

(65) Prior Publication Data

US 2002/0110327 A1 Aug. 15, 2002

(30) Foreign Application Priority Data

Jan. 24, 2001 (DE) .......................... 101 03 100

(51) Int. Cl.[7] .................................. G02B 6/26
(52) U.S. Cl. ...................... 385/46; 385/15; 385/146
(58) Field of Search ............................ 385/15, 46, 146

(56) References Cited

U.S. PATENT DOCUMENTS 6,419,365 B1 * 7/2002 Potekev et al. .............. 353/98
6,443,576 B1 * 9/2002 Nishida et al. .............. 353/98
6,517,210 B2 * 2/2003 Peterson et al. ............. 353/98

* cited by examiner

Primary Examiner—John D. Lee
Assistant Examiner—Tina M Lin
(74) Attorney, Agent, or Firm—Eugene E. Renz, Jr.

(57) ABSTRACT

In a light mixing rod comprising an inlet area and an outlet area, which guides light coupled in via the inlet area along a light guiding direction to the outlet area, two mixing rod portions are provided, which are successively arranged in the light guiding direction and optically coupled with each other, a first of which is in the form of a hollow portion into which the second mixing rod portion extends at least partially.

12 Claims, 5 Drawing Sheets

LIGHT MIXING ROD COMPRISING AN INLET AREA AND AN OUTLET AREA AND USE OF SUCH A LIGHT MIXING ROD IN AN OPTICAL DEVICE COMPRISING A SURFACE TO BE ILLUMINATED

CROSS-REFERENCE TO RELATED APPLICATION

This application claims priority of German patent application no. 101 03 100.9, filed Jan. 24, 2001, the complete disclosure of which is hereby incorporated by reference.

FIELD OF THE INVENTION

The invention relates to a light mixing rod comprising an inlet area and an outlet area, which rod guides light coupled in via the inlet area along a light guiding direction to the outlet area. The invention further relates to the use of such a light mixing rod in an optical device comprising a surface to be illuminated and illumination optics forming an image of the outlet area on the surface to be illuminated.

BACKGROUND OF THE INVENTION

Such a light mixing rod is employed, for example, for uniformly illuminating an imaging element in a digital projector, as it is called. To this end, light from a light source is coupled into the light mixing rod via the inlet area, so as to generate, at the outlet area, a field illuminating as uniformly as possible and whose image is formed on the imaging element by illumination optics. The image generated by the imaging element is then formed on a projection surface by projection optics.

An important factor for high-quality images in such digital projectors is a defined coupling of the light into the light mixing rod. As the light source, a arc generator, as it is called, is conventionally employed, which comprises a reflector having a primary and a secondary focus, the position of said arc generator ideally coinciding with the primary focus of the reflector, so that the light output in the secondary focus is as high as possible. In order to ensure that the light is coupled in well, the light source and the light mixing rod are arranged such that the secondary focus of the reflector lies in the inlet area. It has been found that both the focal length of the reflector, and thus its secondary focus, and the position of the arc generator in the reflector vary strongly depending on manufacturing conditions, so that the light source requires cumbersome adjustment in order to place the secondary focus in the inlet area.

OBJECT AND SUMMARY OF THE INVENTION

In view of the above, it is an object of the present invention to improve the aforementioned light mixing rod such that the above-described difficulties may be almost completely overcome.

According to the invention, this object is achieved by a light mixing rod of the aforementioned type in that the light mixing rod comprises two mixing rod portions disposed successively in the light guiding direction and optically coupled with each other, a first one of them being provided as a hollow portion, into which the second mixing rod portion extends at least partially, so that the length of the light mixing rod is easily adjustable. Thus, for adjustment of the length of the entire light mixing rod, the hollow portion may be slid over the second mixing rod portion, until the desired length of the light mixing rod is achieved. In this position, the two mixing rod portions can be connected with each other in such a way that the length of the light mixing rod is fixed. It is further possible to produce a plurality of the two mixing rod portions, each having a constant length, which allows the cost of manufacturing the light mixing rod to be reduced. The length of the individual light mixing rods may then be adjusted individually by pushing the second mixing rod portion into the hollow portion.

Alternatively, the two mixing rod portions may also be displaceable relative to each other in the light guiding direction, so that the length of the light mixing rod is adjustable not only once, but is variable. Thus, in the manner of a telescope, the second mixing rod portion may be introduced into or pulled out of the hollow portion, which comprises reflectively coated internal surfaces, so that the position of the inlet area is also variable, allowing the inlet area to be easily brought into the desired position. This variability of the length of the light mixing rod is particularly advantageous, for example, if such a light mixing rod is installed in a digital projector and the light source of the digital projector needs to be replaced due to a defect. The variability of the length of the light mixing rod then allows the light mixing rod to be optimally adapted to the new light source.

The light mixing rod may preferably be rectilinear or bent.

In a further advantageous embodiment of the light mixing rod according to the invention, the second mixing rod portion is a solid mixing rod portion. Such a solid mixing rod portion is easy to produce and has the advantage that light which does not traverse it directly is guided by total reflexion at the interfaces of the solid mixing rod portions to the air. Since light is reflected without any loss in the case of total reflexion, this solid mixing rod portion only involves the very small losses of material absorption, so that nearly all of the coupled-in light is passed on.

Further, the light mixing rod according to the invention may be particularly embodied such that the end of the hollow portion averted from the second mixing rod portion forms the inlet or outlet area. This advantageously has the effect that the inlet and/or outlet area is not formed by a material interface, but by the cross-sectional area at the end of the hollow portion. Thus, no misting and/or soiling which would adversely affect the optical properties of the light mixing rod can occur on this inlet or outlet area.

A particularly preferred further embodiment of the light mixing rod according to the invention consists in that the light mixing rod comprises a second hollow portion, which is optically coupled with the second mixing rod portion at an end of the second mixing rod portion averted from the first hollow portion. This has the effect that both the inlet area (the end of the second hollow portion averted from the second mixing rod portion) and the outlet area (the end of the first hollow portion averted from the second mixing rod portion) are not provided as material interfaces, so that soiling and/or misting can occur neither on the inlet area nor on the outlet area.

In a further advantageous embodiment of the light mixing rod according to the invention, it comprises a further mixing rod portion, which is optically coupled with the first hollow portion at the end thereof averted from the second mixing rod portion. Preferably, this further mixing rod portion is a solid mixing rod portion. Thus, a light mixing rod is provided wherein the first hollow portion is an optical coupling element which couples the second and the further mixing rod portion with each other. If the second mixing rod portion and the first hollow portion are displaceable relative to each other in the light guiding direction, the length of the light mixing rod is also variable. If the further mixing rod portion is a solid mixing rod portion, this has the advantageous effect that transmission losses in this solid mixing rod portion are extremely small.

Preferably, the light mixing rod may also be provided with an end portion of hollow cross-section and/or with a starting portion of hollow cross-section, with an end of the end portion forming the outlet area and an end of the starting portion forming the inlet area. Thus, a light mixing rod is also provided wherein no soiling and/or misting, which may adversely affect the optical properties of the light mixing rod, can occur on the inlet and outlet areas due to the hollow cross-sections of the end portion and of the starting portion.

Further, the light mixing rod according to the invention may be further embodied, in particular, such that between the two mixing rod portions, which are displaceable relative to each other, a lubricant, such as e.g. a sheet inlay having a predetermined thickness, is provided in their overlapping region. This ensures the displaceability and advantageously also prevents scratching of the reflectively coated internal surfaces of the hollow portion and of the side surfaces of the second mixing rod portion, if the latter is a solid mixing rod portion. The lubricant need not be present in the entire overlapping region, but may also be provided in just one portion thereof.

The light mixing rod according to the invention may be used, in particular, in an optical device comprising a surface to be illuminated and illumination optics which form an image of the outlet area on the surface to be illuminated. Preferably, the optical device also comprises projection optics for projecting the surface to be illuminated onto a projection surface. Thus, an optical device is provided wherein, due to the structure of the light mixing rod, the inlet area may easily be brought into the desired position in the optical device, e.g. relative to a light source, by changing the length of the rod.

The invention will be explained in more detail below by way of example and with reference to the drawings.

BRIEF DESCRIPTION OF THE DRAWINGS

These and other objects of the present invention and various features and details of the operation and construction thereof are hereinafter more fully set forth with reference to the accompanying drawings, wherein.

DETAILED DESCRIPTION OF THE PREFERRED EMBODIMENTS

Figure 4:
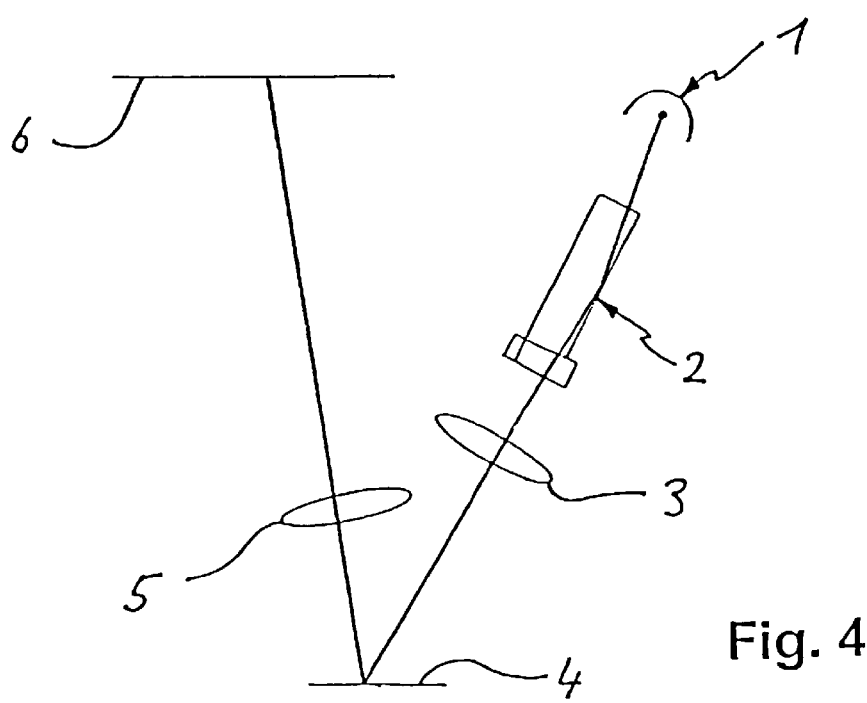
FIG. 4 shows a schematic view of an optical device according to the invention comprising the light mixing rod shown in FIGS. 1 to 3.

FIG. 4 shows a schematic top view of an optical device according to the invention, with an optical path indicated by way of example. The optical device contains a light source 1, a light mixing rod 2 and, disposed subsequently to the light mixing rod 2, illumination optics 3 by which light exiting from the light mixing rod 2 may be imaged onto a surface 4 to be illuminated. The surface 4 to be illuminated is preferably an imaging element and may be, for example, a tilting mirror matrix or an LCD matrix, and the surface to be illuminated is preferably quadrangular, in particular rectangular or square. The optical device further comprises projection optics 5, by which the surface 4 to be illuminated may be projected onto a projection surface 6. Thus, FIG. 4 shows a projection device by which the images generated using the imaging elements may be projected onto the projection surface 6.

The light mixing rod 2 comprises an inlet area 7 facing the light source 1, and an outlet area 8 averted from the light source 1. As particularly shown in FIGS. 1 and 2, the light mixing rod 2 comprises a parallelepiped-shaped solid mixing rod portion 9 consisting of a material, such as glass, which is transparent to light from the light source 1 and whose one end surface forms the inlet area 7, and a hollow portion 10, which is provided at the end of the solid mixing portion 9 averted from the inlet area 7 and is optically coupled with the solid mixing rod portion 9.

The solid mixing rod portion 9 is held by a holding device 11 engaging two side surfaces 12, 14 of the solid mixing rod portion 9 disposed opposite each other. The holding device 11 comprises a base plate 16 having four supports 17, 18, 19, 20 extending upwardly from the base plate, as viewed in FIGS. 1 and 2, with two of these supports 17 to 20 being respectively connected with one of the side surfaces 12, 14. The two supports 17, 18 and 19, 20, respectively, for the respective side surfaces 12, 14 are spaced apart in the longitudinal direction from the inlet area 7 to the outlet area 8 of the light mixing rod 2 and fixed to the solid mixing rod portion 9 in a predetermined contacting region 21, 22 on the side surfaces 12, 14. The fixing may preferably be realized by gluing or cementing. Since the solid mixing rod portion 9 guides the light which is coupled in via the inlet area 7 and does not arrive directly at an end surface 23 of the solid mixing rod 9 opposed to the inlet area 7 in the longitudinal direction, by total reflexion at the side surfaces 12 to 15, the total reflexion is eliminated in the area where the supports 17 to 20 are fixed to the side surfaces 12, 14, which leads to losses in the solid mixing rod portion. Therefore, the contacting regions 21, 22 are preferably provided with a reflective coating, so that total reflexion in these regions is replaced by the reflexion at the reflective coating. As reflective coating, metal layers, e.g. silver layers, may be used which may be additionally provided with a protective layer on their back side averted from the corresponding side surface 12, 14. Alternatively, separate mirrors may also be inserted between the supports 17 to 20 and the side surfaces 12 and 14, or the internal surfaces of the supports 17 to 20, which are contacted in the condition shown in FIG. 1, may be reflectively coated before being contacted, whereby the solid mixing rod portion 9 is then preferably clamped in between the supports 17 to 20.

The hollow portion 10 has a hollow cross-section which is limited by four plates 24, 25, 26, 27 and whose cross-sectional area, in this embodiment, is equal to the cross-sectional area of the solid mixing rod portions 9. The inner sides 28, 29, 30, 31 of the plates 24 to 27 are reflectively coated, so that light impinging on the inner sides 28 to 31 is reflected. The outlet area 8 of the light mixing rod 2 is formed by the end of the hollow portion 10 averted from the inlet area 7.

Figure 2:
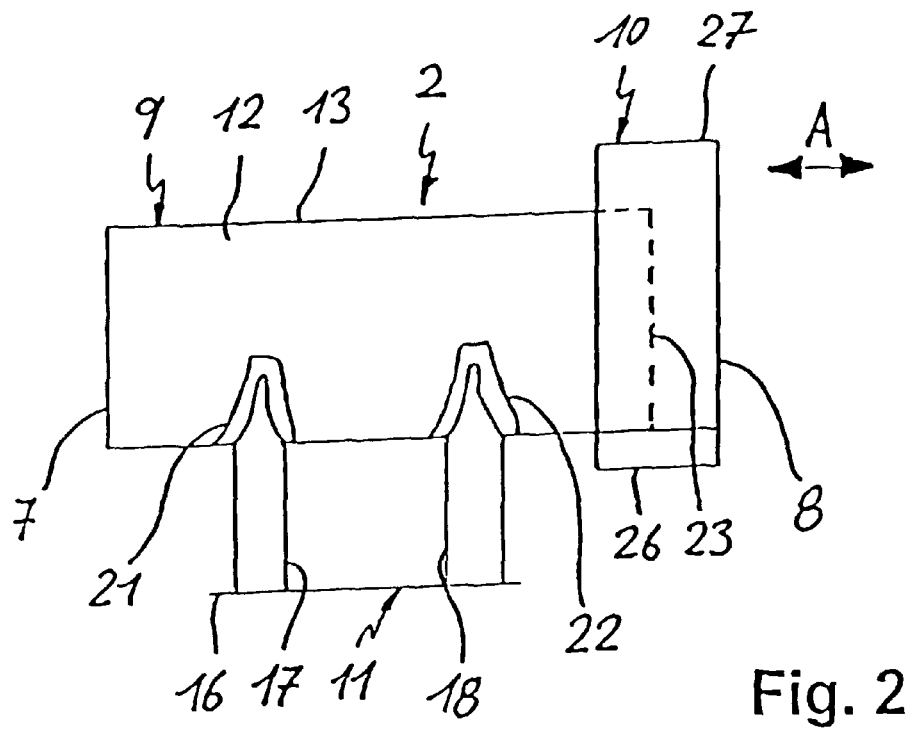
FIG. 2 is a side view of the light mixing rod shown in FIG. 1.

As indicated by the double arrow A in FIG. 2, the hollow portion 10 is displaceable relative to the solid mixing rod portion 9 in the longitudinal direction of the light mixing rod 2, in which direction the light coupled in via the inlet area 7 is also guided (light guiding direction), so that the total length is variable in the longitudinal direction of the light mixing rod 2. Thus, the solid mixing rod portion 9 may be pushed into or pulled out of the hollow portion 10 in a telescopical manner. Alternatively, of course, the solid mixing rod portion 9 may be held back while displacing the hollow portion.

The solid mixing rod portion 9 partially extends into the hollow portion 10, and the corresponding regions of the inner sides 28 to 31 rest on the side surfaces 12 to 15 of the solid mixing rod portions 9 such that they are displaceable. Alternatively, a lubricant may be provided between the inner sides 28 to 31 and the side surfaces 12 to 15, which is either transparent to the light guided inside the light mixing rod 2 or reflects it. Such lubricant may, for example, be a sheet inlay having a defined thickness. This sheet inlay may consist of aluminum or teflon. If the lubricant is reflective, the reflective surface should preferably be as smooth as possible. In case the lubricant is transparent, the contacting surfaces of the lubricant which contact the inner sides 28 to 31 and the side surfaces 12 to 15 should be as smooth as possible, and the lubricant should have a constant thickness. Such lubricant may also be realized by a viscous material having a certain refractive index, with the viscosity of the material being selected such that it also permanently enables displacement of the solid mixing rod portions 9 relative to the hollow portion 10 when the light mixing rod is used.

Figure 3:
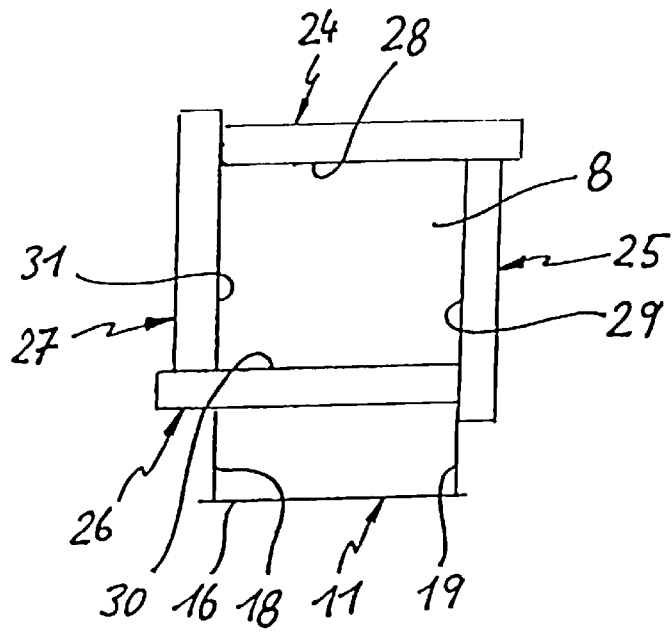
FIG. 3 is a front view of the light mixing rod shown in FIG. 1.

As shown in FIG. 3, the inner sides 28 to 31 respectively meet at a right angle, as viewed in cross-section. In the plates 24 and 27 this is achieved in that the side surface of the plate 24 resting on the inner side 31 of the plate 27 is perpendicular to the inner side 28 of the plate 24. The right angles between the inner sides 28, 29; 29, 30 and 30, 31 are realized in the same way. With this configuration, merely the supported side surfaces of the plates 24 to 27 and the inner sides 28 to 31 (or the edges of the inner sides 28 to 31 limiting the outlet area 8) must be manufactured as exactly as possible. All other edges and surfaces of the plates 24 to 27 may be roughly designed and roughly dimensioned, which simplifies manufacture of the hollow portion 10. The supported side surfaces of the plates 24 to 27 are, for example, cemented or glued onto the corresponding inner sides 28 to 31. Further, the plates 24 to 27 are arranged such that the inner sides 28 to 31 extend perpendicularly to the end surface 23 of the solid mixing rod portion 9, so that the entire light mixing rod 2 also extends rectilinearly.

Figure 1:
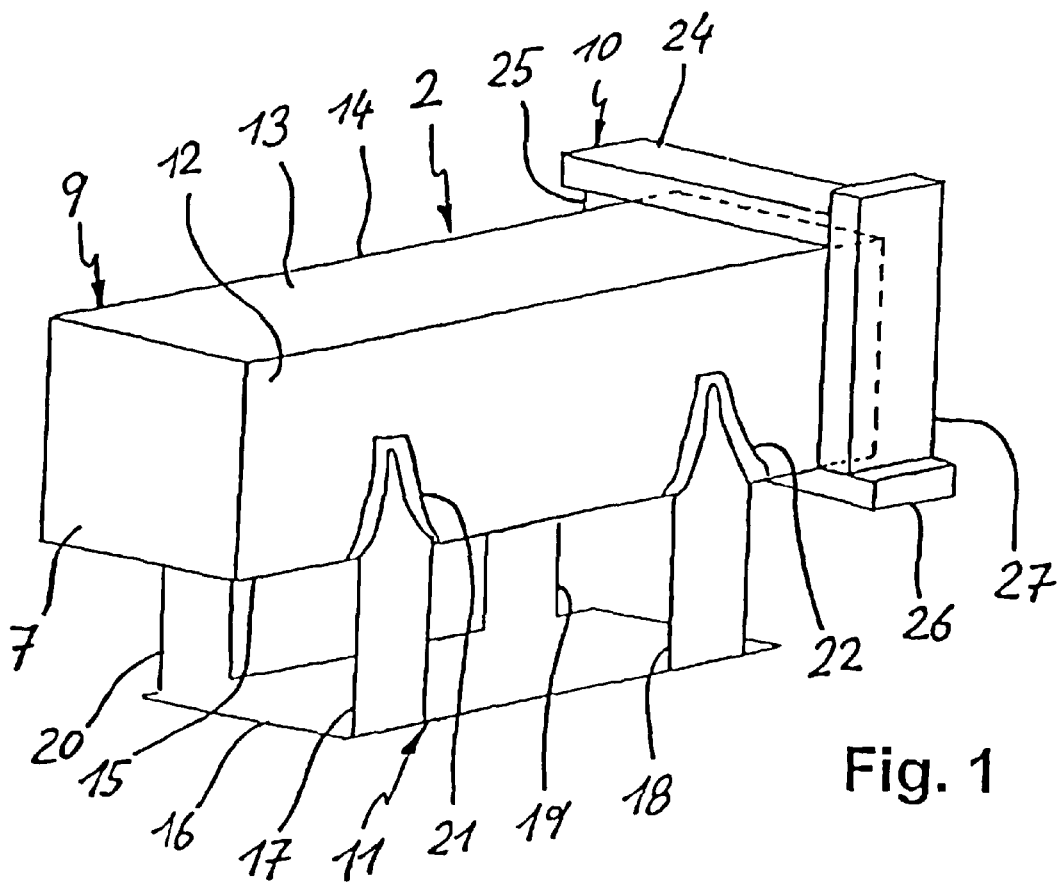
FIG. 1 is a perspective view of a light mixing rod according to the invention.

In the embodiment shown in FIGS. 1 to 3, the holding device 11 may alternatively be formed such that the supports 18 and 19 do not engage the solid mixing rod portion 9, but externally engage the hollow portion 10. Thus, the losses are avoided which occur at the contacting regions of the supports 18 and 19 on the side surfaces 12 and 14 in the embodiment shown in FIGS. 1 to 3. If that part of the hollow portion 10 which extends across the solid mixing rod portion 9 is large enough, the holding device 11 of a further alternative may be formed such that it only engages the hollow portion 10. This will prevent any losses being caused by the holding device.

The light mixing rod 2 is incorporated into the optical device shown in FIG. 4 in such a manner that the position of the hollow portion 10 is stationary and cannot be changed. This is of advantage for good optical properties of the optical device, because it will ensure that the outlet area 8 is always optimally positioned in the optical device. However, the holding device 11 of the solid mixing rod portion 9 is formed such that the holding device and, consequently, also the retained solid mixing rod portion 9 are displaceable in the longitudinal direction of the light mixing rod 2. To this end, for example, a long hole (not shown), which extends in the longitudinal direction of the light mixing rod 2 and into which an immobilized pin of the optical device extends, may be provided in the base plate 16. Thus, the solid mixing rod portion 9 is lengthwise displaceable relative to the hollow portion 10, so that the length of the light mixing rod 2 and, consequently, at the same time also the position of the inlet area 7 may be changed. In other words, this light mixing rod 2 allows the position of the inlet area 7 to be optimally adjusted in a simple manner, so that, for example, the secondary focus of the light source 1 always lies in the inlet area 7.

The light mixing rod 2 is preferably designed such that, in the condition shown in FIG. 1, the length of the part of the hollow portion 10 extending beyond the solid mixing rod portion 9 in the longitudinal direction of the light mixing rod 2 (i.e. the protruding hollow portion) is greater than the depth of focus of the illumination optics 3 plus the length of the provided displacement region. The contribution concerning the depth of focus is preferably selected such that it is at least one order of magnitude greater than the depth of focus. This ensures that any soiling or misting on the end surface 23 of the solid mixing rod portion 9 will not lead to any substantial deterioration in the illumination of the surface 4 to be illuminated, even if the length of the light mixing rod 2 is changed by displacement of the solid mixing rod portion 9.

In the light mixing rod 2 shown in FIGS. 1 to 3, the light mixing of the coupled-in light is essentially effected in the solid mixing rod portion 9, so as to benefit from the advantage of the very small transmission losses of a solid mixing rod. Further, the outlet area 8 is defined by the end of the hollow portion 10, so that the outlet area 8 is always free from misting and soiling. Thus, an optimized light mixing rod is provided, whose length is adjustable as well.

Figure 5:
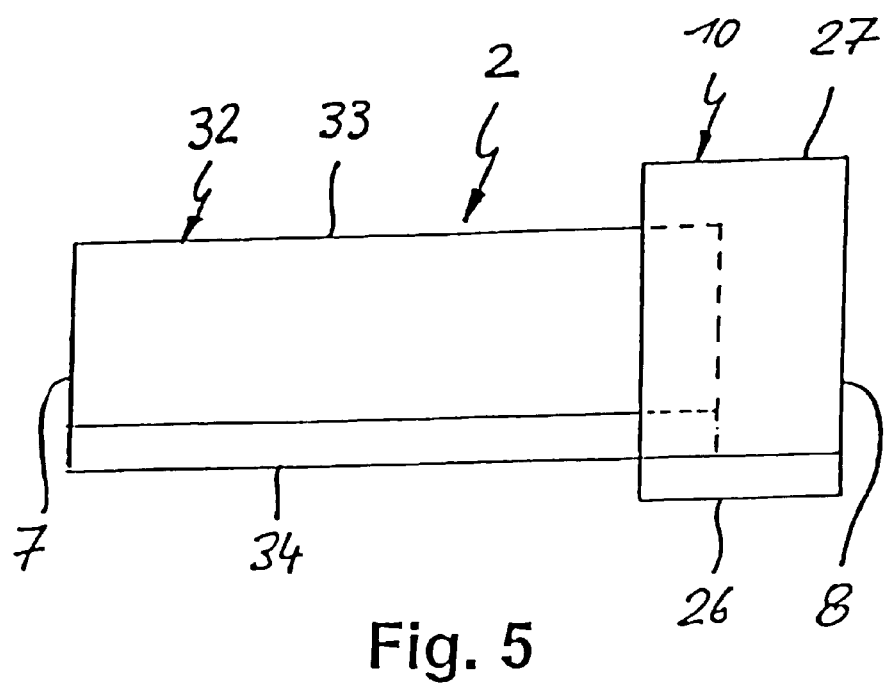
FIG. 5 is a side view of a further embodiment of the light mixing rod according to the invention.

In a further embodiment of the light mixing rod 2 according to the invention, shown in FIG. 5, a hollow mixing rod portion 32 is provided instead of the solid mixing rod portion 9, being in turn slidable into and extractable out of the hollow portion 10 in the longitudinal direction of the light mixing rod 2 in the manner of a telescope, so as to change the length of the light mixing rod 2. In a similar manner as the hollow portion 10, the hollow mixing rod portion 32 is made up of four plates (of which only the plates 33, 34 are visible in the side view of FIG. 5), whose inner sides are reflectively coated. Since, in the hollow mixing rod portion 32, light is guided along the reflectively coated inner sides of the plates 33, 34, the structure of a holding device for the hollow mixing rod portion 32 is no problem because it can engage the outsides of the plates 33, 34, which do not contribute to the light guiding in the hollow mixing rod portion 32. The holding device may be, for example, similarly structured as the holding device 11 shown in FIG. 1, but there will be no need to reflectively coat the contacting regions, in which the supports are fixed to the hollow mixing rod portion 31. To assist the telescope-like displacement, a lubricant, e.g. a sheet inlay having a defined thickness, may be interposed between the hollow portion 10 and the hollow mixing rod portion 32 in the same manner as in the embodiment of FIG. 1.

In this light mixing rod 2, it is also advantageous that the inlet area 7 is formed by an end of the hollow mixing rod portion 32 averted from the hollow portion 10, so that no misting or soiling may form on the inlet area 7 either, which improves the optical properties of the light mixing rod 2. Further, in the light mixing rod shown in FIG. 5, the cross-sectional area of the hollow portion 10 is also greater than that of the hollow mixing rod portion 32, so that this light mixing rod 2 allows the cross-sectional area of the light mixing rod 2 to be changed in a simple manner.

Figure 6:
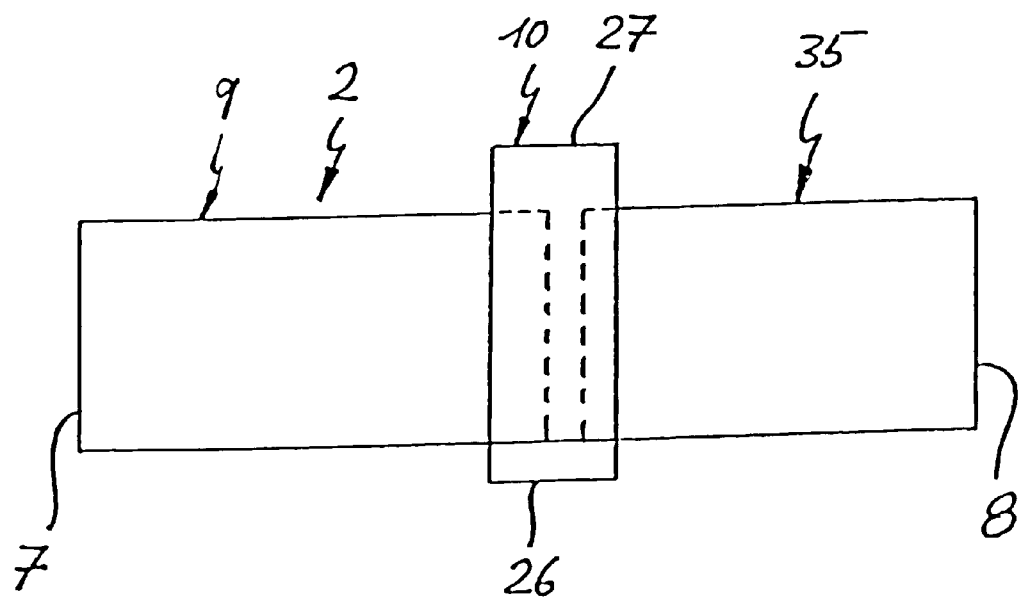
FIG. 6 is a side view of a light mixing rod of the invention according to a further embodiment.

A further embodiment of the light mixing rod 2 according to the invention is shown in FIG. 6. This embodiment differs from that shown in FIGS. 1 to 3 in that a further solid mixing rod portion 35 partially extends into the hollow portion 10 from the side averted from the solid mixing rod portion 9. Like the solid mixing rod portion 9, this further solid mixing rod portion 35 may be positioned to be lengthwise displaced. Preferably, however, this solid mixing rod portion 35 is not displaceable, and its position is stationary relative to the hollow portion 10. In this embodiment, the hollow portion 10 is an optical coupling element, which provides an optical coupling between the two solid mixing rod portions 9 and 35. At the same time, the total length of the light mixing rod 2 may be varied due to the hollow portion 10, so that, when this light mixing rod is used in the device shown in FIG. 4, the position of the inlet area 7 is adjustable.

Figure 7:
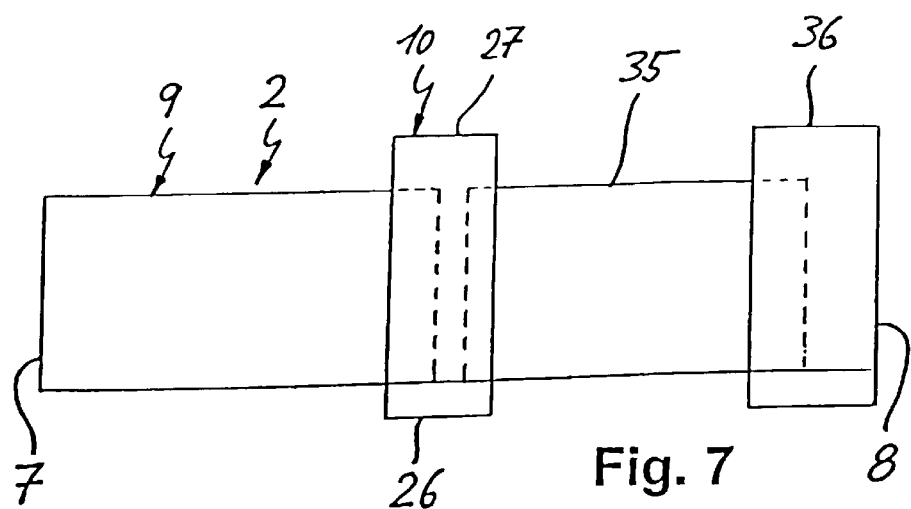
FIG. 7 is a side view of a further embodiment of the light mixing rod according to the invention as shown in FIG. 6.

FIG. 7 shows a further embodiment of the light mixing rod 2 shown in FIG. 6. In this further embodiment, the outlet area 8 is formed by an end of an end portion 36, which is optically coupled with the solid mixing rod portion 35, said end averted from the inlet area 7 as viewed in the longitudinal direction of the light mixing rod 2. The end portion 36 has a hollow cross-section and thus also has the advantage that the outlet area 8 is not formed by a material interface, so that no soiling nor misting which would adversely affect the optical properties of the light mixing rod can occur on the outlet area 8. The end portion 36 is formed by four plates in the same manner as the hollow portion 10 and partially overlaps the solid mixing rod portion 35. Preferably, the end portion 36 may be glued or cemented onto the solid mixing rod portion. However, for fixation, a piece of shrink tubing may also be used which, in the condition shown in FIG. 7, is fitted over the end portion 36 and heated so that it contracts, thus urging the plates of the end portion 36 against each other and against the solid mixing rod portion 35 by elastic pretension and fixing the end portion to the solid mixing rod portion 35.

Figure 8:
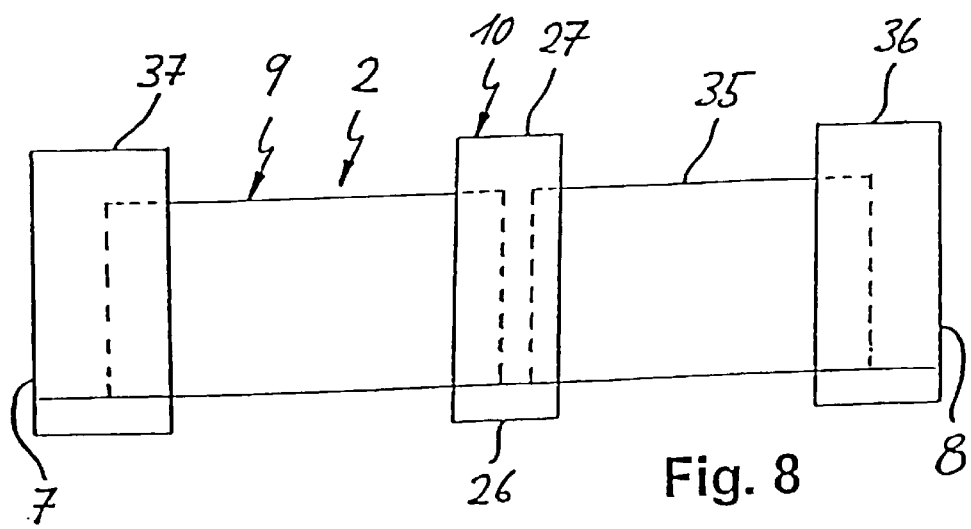
FIG. 8 is a side view of a further embodiment of the light mixing rod according to the invention as shown in FIG. 7.

A further embodiment of the light mixing rod 2 of FIG. 7 is shown in FIG. 8. At its inlet end, this light mixing rod 2 additionally comprises a starting portion 37, which is optically coupled with an end of the solid mixing rod portion 9 averted from the hollow portion 10. The starting portion 37 is a hollow portion and thus has a hollow cross-section, and the starting portion 37 is preferably structured in the same manner as the end portion 36 and attached to the solid mixing rod portion 9 in a comparable manner. In this embodiment, the inlet area 7 is formed by an end of the starting portion 37 averted from the solid mixing rod portion 9, so that the inlet area 7 is not defined by a material interface either. Consequently, no misting or soiling which would adversely affect the optical properties of the light mixing rod 2 can occur on the inlet area 7. Further, thermal stress on the material of the light mixing rod 2 is also reduced, because the secondary focus of the light source 1 lies in the plane of the inlet area 7, which is not a material end surface of the light mixing rod 2 due to the hollow cross-section of the starting portion 37.

Figure 9:
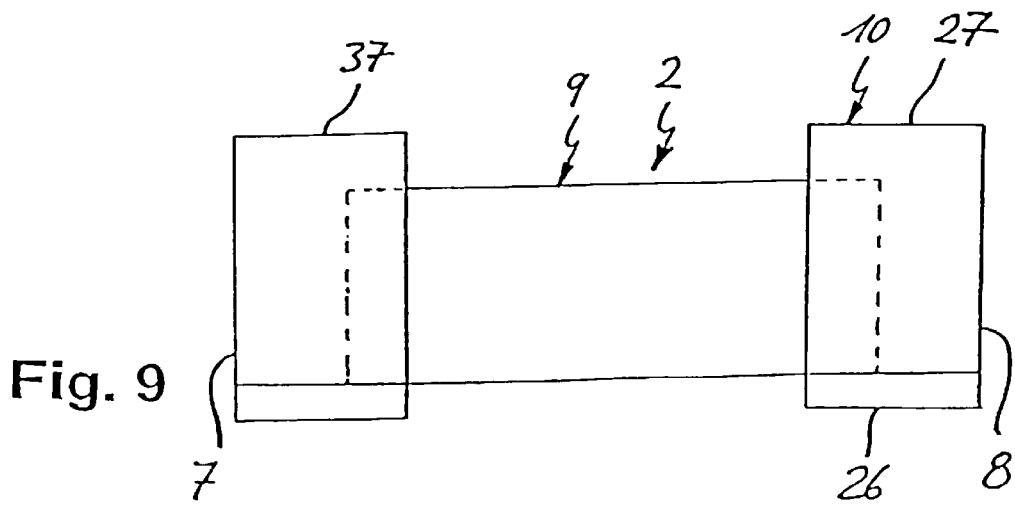
FIG. 9 is a side view of the light mixing rod of the invention according to a further embodiment.

As shown in FIG. 9, such a starting portion 37 may, of course, be provided also in the embodiment of the light mixing rod 2 shown in FIGS. 1 to 3. Thus, the same advantages as in the embodiment shown in FIG. 8 are achieved.

Alternatively, the embodiments of the light mixing rod 2 shown in FIGS. 1, 5 and 7 could each be arranged in such a manner in the optical device shown in FIG. 4 that the hollow portion 10 or the end portion 36 is turned towards the light source 1. In this case, the end of the hollow portion 10 or of the end portion 36 facing the light source 1 would then form the inlet area 7. This leads to the above-described advantages of reduced material stress and of the inlet area 7 being free from soiling and misting. In this case, the position of the solid mixing rod portion 9 or of the hollow mixing rod portion 32 in the optical device unchangeable, and the hollow portion 10 or the end portion 36 is displaced for optimal positional adjustment of the inlet area 7. When proceeding in this manner, the position of the outlet area 8 is retained, thus enabling an optimal arrangement of the illumination and projection optics 3, 5.

In the embodiments shown in FIGS. 6 to 9, the holding device for the light mixing rod may, in turn, also be designed such, in each case, that it partially or completely engages the respective hollow portions 10, 36 and 37, so that, compared to the case in which the holding device engages the solid mixing rod portion 9, losses can be prevented as well.

Figure 10:
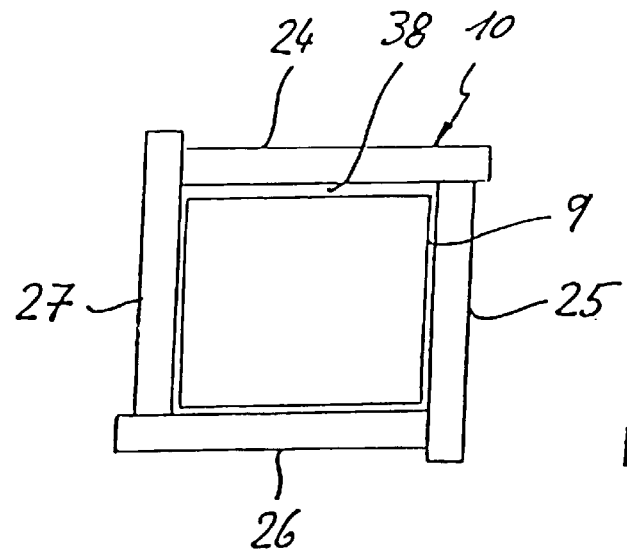
FIG. 10 is a front view showing an embodiment of the light mixing rod according to the invention as shown in FIGS. 1 to 3.

A further preferred embodiment of the light mixing rod 2 according to the invention is shown in FIG. 10. This embodiment differs from that shown in FIGS. 1 to 3 in that the cross-sectional area of the hollow portion 10 is greater than the cross-sectional area of the solid mixing rod portion 9. The solid mixing rod portion 9 and the hollow portion 10 are arranged such that the centers of their cross-sectional areas are situated on a central longitudinal axis of the light mixing rod 2, so that, in the region in which the hollow portion 10 overlaps the solid mixing rod portion 9, a gap 38 is present between the solid mixing rod portion 9 and the hollow portion 10 in the overlapping region. Thus, the light in the light mixing rod 2 is guided to the end surface 23 of the solid mixing rod portion 9 by total reflexion, said light being guided by reflexion at the plates 24 to 27 only in the protruding part of the hollow portion 10. This reduces the losses caused by the reflexions at the plates 24 to 27 as compared with the light mixing rod 2 shown in FIGS. 1 to 3. In this embodiment, of course, the hollow portion 10 is provided with its own holding device (not shown), by which the relative position of the solid mixing rod portion 9 and of the hollow portion 10 in the cross-sectional plane is retained.

The end portion 36 of the embodiments shown in FIGS. 7 and 8 may also be realized according to the embodiment shown in FIG. 10.

Figure 11:
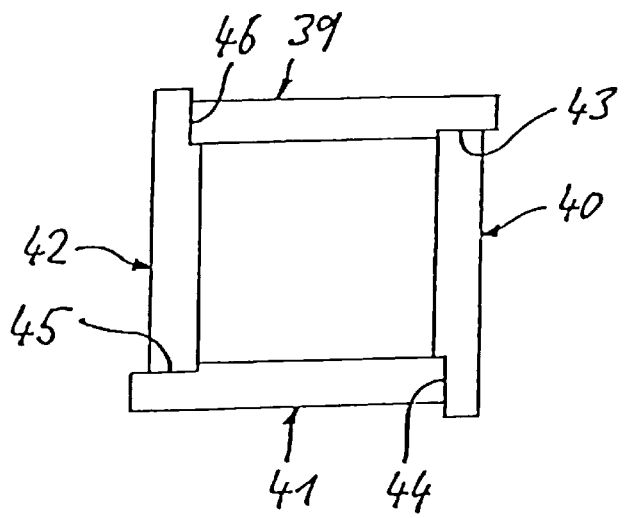
FIG. 11 is a front view of a hollow portion for a light mixing rod according to the invention.
Figure 12:
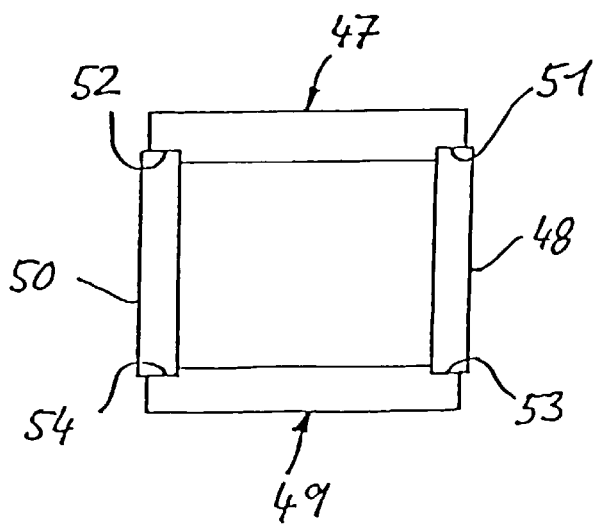
FIG. 12 is a front view of a further hollow portion for a light mixing rod according to the invention.

FIGS. 11 and 12 show further possibilities of assembling a hollow portion from four plate-shaped elements. These structural variations may be applied to the above-described mixing rod portions having a hollow cross-section. In the embodiment shown in FIG. 11, all plates 39, 40, 41, 42 are of the same design and each of them comprises, at one inner side thereof, a longitudinally extending recess 43, 44, 45, 46, which is contacted by the corresponding plate 40, 41, 42, 39.

In the embodiment shown in FIG. 12, opposite pairs of plates 47 and 49 as well as 48 and 50 are each of the same design. The plates 47 and 49 are each internally provided, at both ends, with one longitudinally extending recess 51, 52, 53, 54, in which the two other plates 48, 50 of rectangular cross-section are guided.

In the embodiments shown in FIGS. 11 and 12, the plates may be glued or cemented to each other, or instead, one or more pieces of shrink tubing (not shown) may be fitted over the plates, in the condition shown in FIGS. 11 and 12, and then heated so as to contract such that the plates are urged against each other by elastic pretension.

The light mixing rod according to the invention may not only have a rectangular cross-sectional shape, but may also be of square, quadrangular or any other cross-sectional shape.

What is claimed is:

1. A light mixing rod comprising an inlet area and an outlet area, said rod guiding light, coupled in via the inlet area, along a light guiding direction to the outlet area, wherein the light mixing rod comprises two mixing rod portions disposed successively in the light guiding direction and optically coupled with each other, a first one of them being provided as a hollow portion, into which the second mixing rod portion extends at least partially.

2. The light mixing rod as claimed in claim 1, wherein both mixing rod portions are displaceable relative to each other in the light guiding direction, and thus the length of the light mixing rod is variable.

3. The light mixing rod as claimed in claim 1, wherein the second mixing rod portion is a solid mixing rod portion.

4. The light mixing rod as claimed in claim 1, wherein the end of the hollow portion averted from the second mixing rod portion forms the inlet or outlet area.

5. The light mixing rod as claimed in claim 1, wherein the light mixing rod comprises a second hollow portion, which is optically coupled with the second mixing rod portion at the end thereof averted from the first hollow portion.

6. The light mixing rod as claimed in claim 1, wherein the light mixing rod comprises a further mixing rod portion, which is optically coupled with the hollow portion at the end thereof averted from the second mixing rod portion.

7. The light mixing rod as claimed in claim 6, wherein the further mixing rod portion is a solid mixing rod portion.

8. The light mixing rod as claimed in claim 6, wherein the light mixing rod comprises a hollow cross-section end portion, which is optically coupled with the further mixing rod portion and whose end averted from the further mixing rod portion forms the outlet area.

9. The light mixing rod as claimed in claim 6, wherein the light mixing rod comprises a hollow cross-section starting portion, which is optically coupled with the second mixing rod portion and whose end averted from the second mixing rod portion forms the inlet area.

10. The light mixing rod as claimed in claim 2, wherein between the two mixing rod portions, which are displaceable relative to each other, a lubricant is provided in their overlapping region.

11. The use of a light mixing rod as claimed in claim 1 in an optical device comprising a surface to be illuminated and illumination optics forming an image of the outlet area on the surface to be illuminated.

12. The use as claimed in claim 11, wherein the optical device comprises projection optics for projecting the surface to be illuminated onto a projection surface.

* * * * *